Sept. 20, 1949.          C. L. STEVENS ET AL          2,482,381
                         METHOD OF TESTING BEARINGS
Filed March 17, 1945                                  2 Sheets-Sheet 1
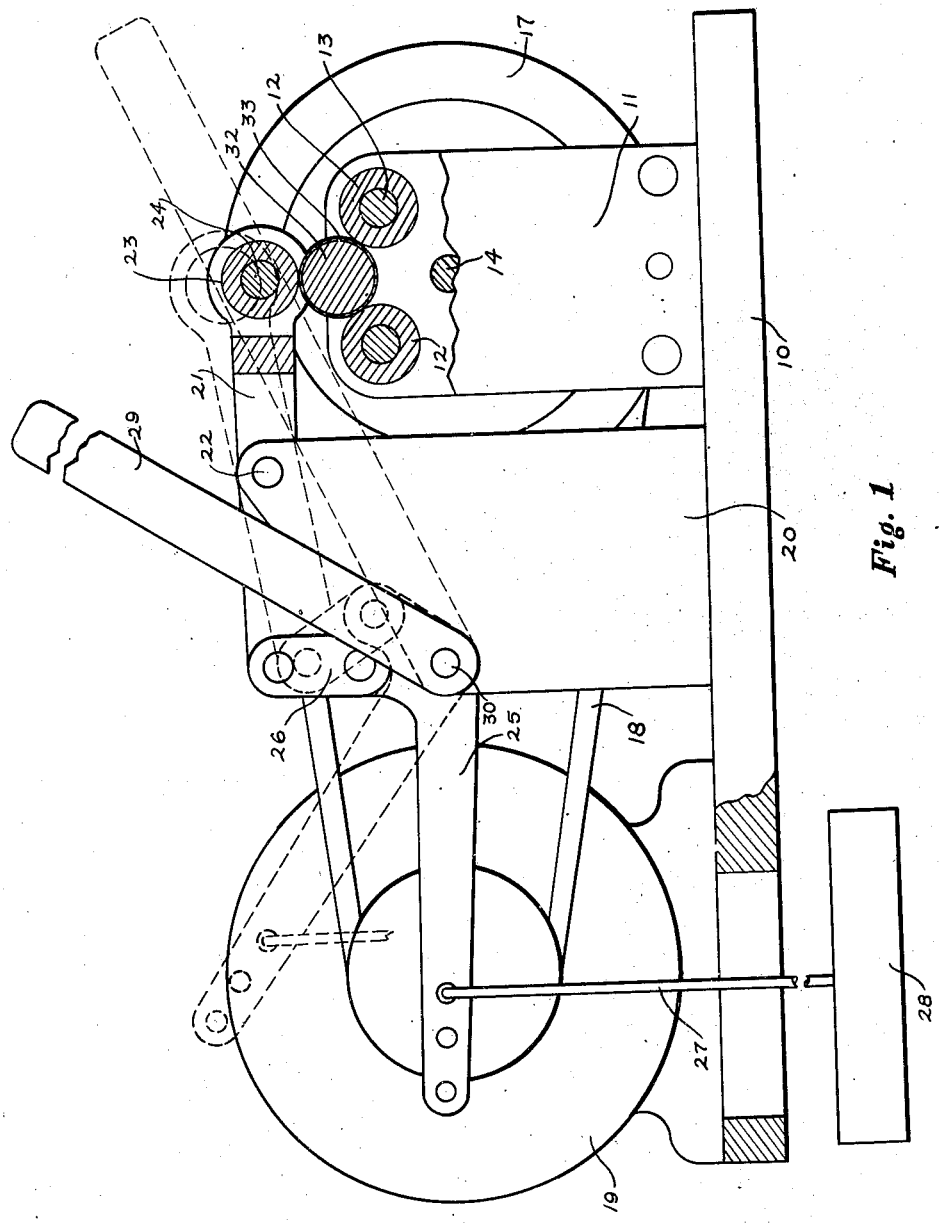
C. L. STEVENS
C. J. MOODY
INVENTORS Sept. 20, 1949.　　C. L. STEVENS ET AL　　2,482,381
METHOD OF TESTING BEARINGS
Filed March 17, 1945　　2 Sheets-Sheet 2
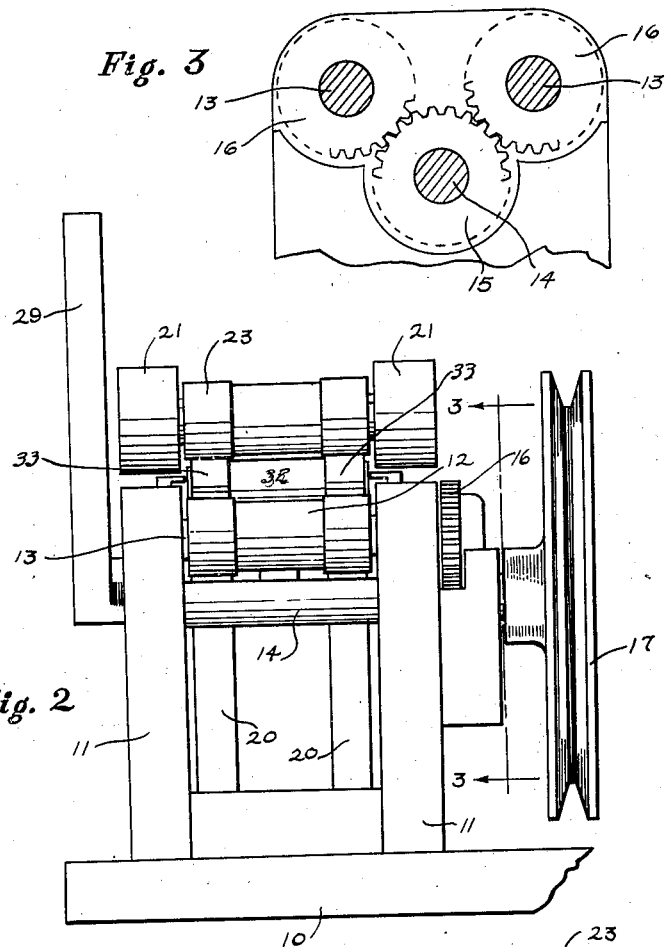
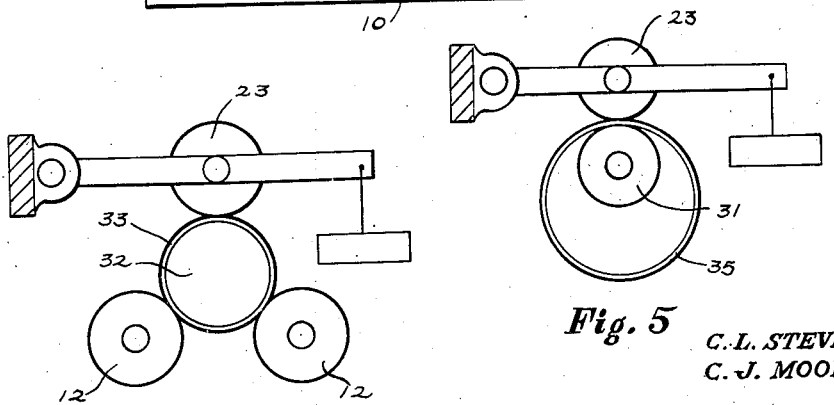
C. L. STEVENS
C. J. MOODY
INVENTORS Patented Sept. 20, 1949

2,482,381

UNITED STATES PATENT OFFICE 2,482,381

METHOD OF TESTING BEARINGS

Claud L. Stevens and Clifford J. Moody, Detroit, Mich., assignors to Ford Motor Company, Dearborn, Mich., a corporation of Delaware Application March 17, 1945, Serial No. 583,234

2 Claims. (Cl. 73—150)

One object of our invention is to provide a new and improved method of testing bearings whereby the defects commonly associated with such bearings may be more easily detected.

In the drawings,

Figure 1 is a side elevation of one form of machine for carrying out our invention.

Figure 2 is a front elevation of the machine shown in Figure 1.

Figure 3 is a sectional view, taken upon the line 3—3 of Figure 2.

Figure 4 is a diagrammatic view, illustrating the rolling action involved in our testing procedure, and Figure 5 is also a diagrammatic view, illustrating the rolling of internal bearing sleeves.

Before describing the machine illustrated, it may be well to mention that our improved method of bearing testing—while particularly suitable for use in connection with aircraft engine bearings—is also suitable for testing any bonded bearings. Aircraft engine bearings usually consist of a steel backing member upon which a thin layer of bearing metal is deposited. The bearing metal is usually silver and is deposited by electroplating to a thickness of about .005 inch. In many instances, an extremely thin film of lead (.002 inch) is deposited over the finished silver, although for operation under high impact loads the lead film is usually dispensed with. In either instance, a microscopic film of indium is deposited over the silver or lead, which film prevents attack of the bearing surface, due to the acids formed when the lubricating oil breaks down in operation of the engine.

While the life of such bearings depends upon many factors, it is paramount that the bonded joint between the backing member and the silver be continuous over the full bearing area, otherwise premature failure will result. Our improved method of testing bearings discloses what is believed to be a new method of detecting an inadequate bond between the bearing metal and the backing member, so that those bearings having such inadequate bonds may be discarded before they are assembled in engines.

Many methods are now in use for detecting poor bonds between the bearing metal and the backing members, such as X-ray inspection, supersonic reflection methods, and others, but our improved method is believed superior to any of these methods in that definite indications of inadequate bonding are more easily obtained than with other methods.

Our improved method of testing consists in successively elongating increments of the layer of bearing metal over the full bearing area. If an inadequate bond is present at any point, the elongated increments will not be returned to their initial shape, so that such elongation will cause the layer above such inadequate bond to raise up from the backing member and give the appearance of a blister upon the bearing surface. Such blisters are easily detected by visual inspection alone.

Furthermore, bearings treated in this manner seem to have the crystalline structure of the bearing metal altered, so that a longer lasting bearing surface results. Of course, no change occurs in the chemical composition of the metal, but the structural modification in the metal from the form in which it is deposited materially increases the life of the bearing under operating conditions.

Referring to Figures 1 and 2 of the accompanying drawings, we have provided a base plate 10 upon which a U-shaped roller support 11 is fixedly secured. A pair of driving rollers 12 are rotatably mounted, side by side, near the upper portion of the support 11, by means of shafts 13. A pulley shaft 14 is also rotatably mounted in the support 11 directly beneath and between the rollers 12. A driving gear 15 is fixed to the shaft 14 in position to mesh with the driven gears 16 on the respective shafts 13. Thus, rotation of the shaft 14 causes simultaneous rotation of the rollers 12. A pulley 17 is fixed to the shaft 14 and is driven by a belt 18 from a motor 19, which is mounted on the rear portion of the base 10.

The bearing to be tested is supported directly upon the rollers 12 and is rotated by frictional engagement with these rollers. This particular machine is designed to test a pin bearing which consists of a solid cylindrical steel center member 32, having silver-coated peripheral portions, the silver coating being numbered 33.

Means is provided for operatively forcing a work roller into engagement with the silvered surfaces of the bearing under a predetermined load so as to work the bearing surfaces upon rotation of the pin 32. An arm support 20 is fixed to the base 10 directly in back of the roller support 11. An arm 21 is pivotally mounted at 22 to the support 20, the forward end of which arm is forked to receive a work roller 23 which is rotatably mounted thereon by means of a pin 24. The arm 21 is so proportioned that when it is swung downwardly, the roller 23 will move into engagement with the upper surface of the pin bearing surfaces.

A toggle arm 25 is pivotally mounted upon the rear portion of the arm support 20, and a pair of toggle links 26 are pivotally connected thereto and extend upwardly where they are pivotally secured to the rear end of the work roller arm 21. The other end of toggle arm 25 is provided with openings therethrough into which a hook 27 may be inserted. A weight 28 is secured to the lower end of the hook 27 to pull the arm 25 downwardly.

A manually operable lever 29 is fixed to a shaft 30 which supports the toggle arm 25, so that the weight 28 may be manually raised when a bearing is to be inserted or removed from the machine.

In operation, the machine is run continuously. When it is desired to test a bearing, the lever 29 is moved to the dotted line position shown in Figure 1, which raises the toggle arm 25 and weight 28, thereby forcing the toggle links 26 forwardly to move the rear end of the arm 21 downwardly and thus raise the work roller from its normal operative position. The pin bearing to be tested is then inserted between the two driving rollers 12, and the lever 29 is released. The weight 28 moves the lever to its operative position and, due to the action of the toggle link 26, the pressure applied on the bearing by the roller 23 is considerably amplified. The size of the weight 28 and the proportions of the toggle links is chosen, so that a pressure of 30 to 50 pounds on the work roller is provided for each lineal inch of bearing being tested. The speed of the work rollers is designed to produce a peripheral rolling speed at about 200 feet per minute. With this speed, and operating under the aforementioned pressure, an inadequate bond between the bearing metal and the steel backing member will cause the bearing metal to blister in less than five seconds of rolling time.

In carrying out our process in the testing of the above-described pin bearing, the silver bearing coating 33 is deposited upon the backing member 32 by electroplating, the silver being deposited to a thickness of .005 to .008 inch. The plated member is then turned in a lathe to provide a smooth bearing surface leaving the coating of about .004 inch thick. The bearing, at this stage, is worked in the machine just described and if an inadequate bond exists at any place between the pin and the silver, the silver surface will blister so that the most cursory visual inspection will detect the defect. If no defect appears after rolling, the bearing is then finish-turned. If a lead coating is to be provided, the coating is then plated upon the rolled surfaces.

Figure 4 of the attached drawings, shows diagrammatically the operation of the machine just described. However, it will be understood that the many different styles of bearings will require modifications in the design of the machine. For example: if a sleeve type bearing 35 is to be treated, the machine should be designed as shown diagrammatically in Figure 5. In this case, an internal driving roller 31 should be provided which fits inside of the bearing shell. The work roller 23 should be designed to swing down against the outside of the shell 35. The bearing metal may be on the inside or outside of the shell or on both, in each of which cases it will be worked the same as the metal on the outside of the pin bearing previously described.

Among the many advantages arising from the use of our improved method of testing bearings is that defects in bond between the bearing metal and the backing member can be detected before the bearing is installed.

Furthermore, the bearing surface is changed so that better bearing performance results.

Some changes may be made in the arrangement, construction and combination of the various steps of our improved process without departing from the spirit of our invention, and it is our intention to cover by our claims such changes as may be reasonably included within the scope thereof.

We claim as our invention:

1. The method of testing bearings having a thin layer of soft bearing metal bonded to a hard backing member, comprising, rolling the surface of said bearing metal sufficiently to cause blistering of said layer in the event that said bond is inadequate.

2. The method of testing bearings having a thin layer of soft bearing metal bonded to a hard backing member, comprising, rolling the surface of said bearing metal without distorting the hard backing member, said rolling being sufficiently intense to cause blistering of the soft bearing metal layer in the event said bond is inadequate.

CLAUD L. STEVENS.
CLIFFORD J. MOODY.

REFERENCES CITED

The following references are of record in the file of this patent:

UNITED STATES PATENTS

| Number | Name | Date |
| --- | --- | --- |
| 413,465 | Svensson | Oct. 22, 1889 |
| 488,499 | Hollingshead | Dec. 20, 1892 |
| 1,236,438 | Huggins | Aug. 14, 1917 |
| 1,851,934 | Stockfleth | Mar. 29, 1932 |
| 1,945,294 | Pike et al. | Jan. 30, 1934 |
| 2,049,202 | Edelmeier | July 28, 1936 |
| 2,266,319 | Hobbs | Dec. 16, 1941 |
| 2,339,855 | Hodil et al. | Jan. 25, 1944 |
| 2,373,871 | Connor | Apr. 17, 1945 |

FOREIGN PATENTS

| Number | Country | Date |
| --- | --- | --- |
| 3,569 | Great Britain | 1876 |
| 341,704 | Great Britain | Jan. 22, 1931 |

OTHER REFERENCES

"Bearing Metals for the New Wartime Conditions," page 39 of April 15, 1942, Automotive and Aviation Industries.